D. M. BELL.
SPEEDOMETER.
APPLICATION FILED JUNE 23, 1908.
961,835.
Patented June 21, 1910.
2 SHEETS—SHEET 1.
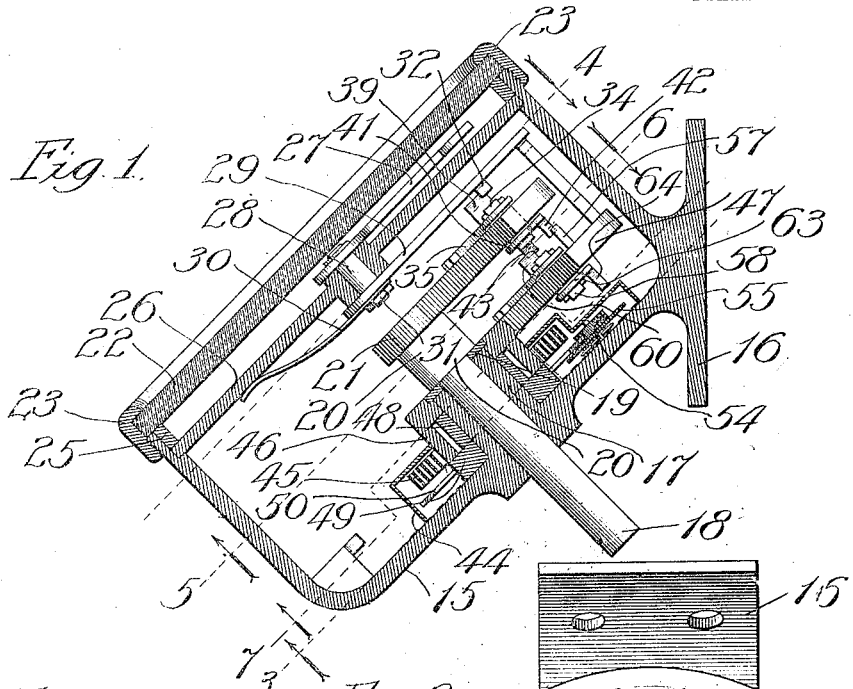
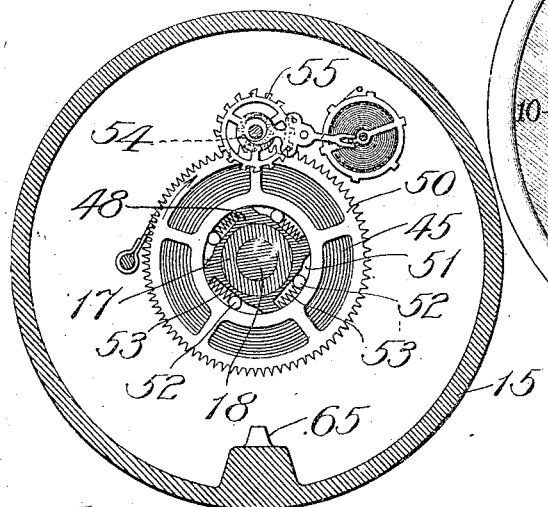
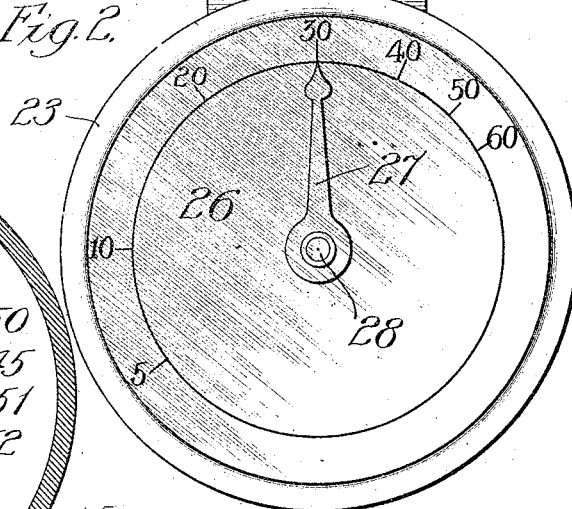
Witnesses:
John Enders
Chas. H. Bull.
Inventor:
Dillwyn M. Bell.
By Sheridan & Wilkinson,
Attys.

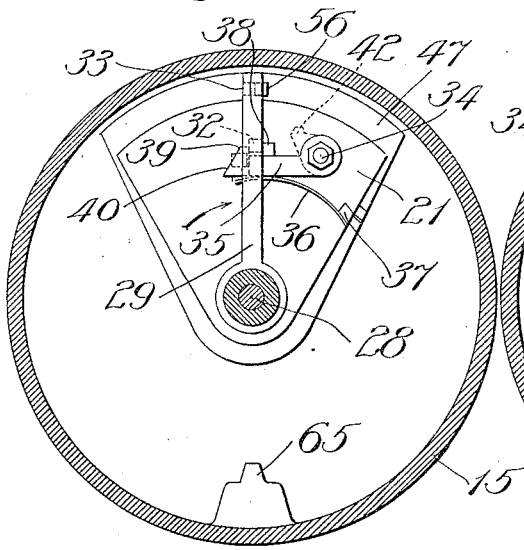
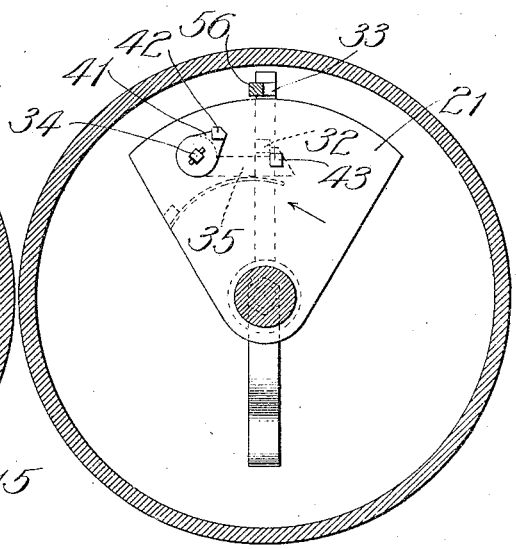
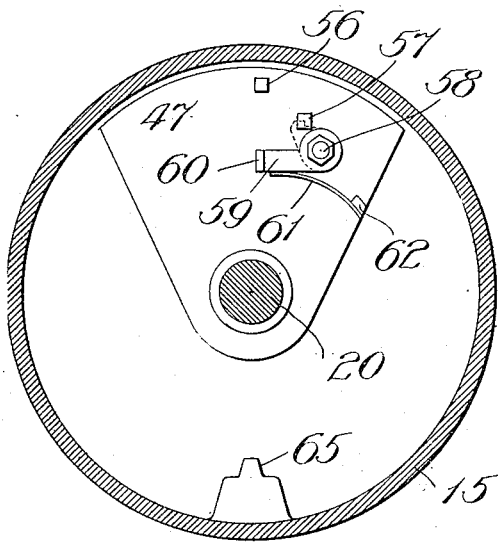
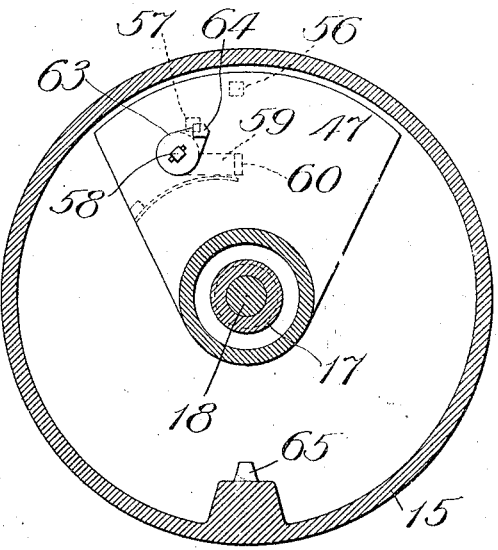

UNITED STATES PATENT OFFICE.

DILLWYN M. BELL, OF OAK PARK, ILLINOIS, ASSIGNOR TO THE BASTIAN-BLESSING COMPANY, OF CHICAGO, ILLINOIS, A CORPORATION OF ILLINOIS.

SPEEDOMETER.

961,835.  Specification of Letters Patent.  Patented June 21, 1910.

Application filed June 23, 1908. Serial No. 439,927.

*To all whom it may concern:*

Be it known that I, DILLWYN M. BELL, a citizen of the United States, residing at Oak Park, in the county of Cook and State of Illinois, have invented certain new and useful Improvements in Speedometers, of which the following is a specification.

The principal object of my invention is to provide a new and improved device for indicating speed, as for example, the speed at which an automobile is traveling.

My invention relates to a speedometer in which a clock mechanism is combined with a mechanism driven by a moving element the speed of which it is desired to measure and indicate.

The purposes and advantages of my invention will be understood from the following specification and claims taken in connection with the accompanying drawings, in which—

Figure 1 is an axial section of one embodiment of my invention. Fig. 2 is a face view of the device. Figs. 3, 4, 5, 6 and 7 are sections taken on the correspondingly numbered lines looking in the directions of the respective arrows.

In the particular embodiment of my invention which I have chosen to illustrate and describe in this specification, I have shown the device as comprised within a casing 15 having flanges 16 by which it may be readily secured to an automobile dash-board. The sleeve 17 formed integrally with the casing wall forms a journal for the shaft 18 which is driven by the part the speed of which is to be measured. This shaft 18 has a collar 20 within the casing 15 and resting upon the washer 19. Beyond the collar 20 there is attached a sector 21, which will be more fully described later.

A glass plate 22 closes the front face of the casing 15, being held in place by the screw-threaded flanged ring 23. On the ledge 24 in the casing wall rests a dial-plate 26, spaced from the glass plate 22 by the ring 25. The pointer 27 is fixed to the stem 28 which is mounted in a journal in the center of the dial-plate 26. Also fixed to the stem 28 on the opposite side of the dial-plate 26 from the pointer 27 is the arm 29. A leaf-spring 30 is also secured by the nut 31 to the stem 28, and the end of this leaf-spring presses against the inner face of the dial. The arm 29 carries two lugs 32 and 33, the purpose of which will be explained subsequently. A short rotatable shaft 34 passes through the sector 21 carrying an arm 35 fixed to its upper end and an arm 41 fixed to its lower end.

As shown in Fig. 4, a leaf-spring 36 having one end fastened to the sector 21 at the point 37 presses the arm 35 against the stud 38 on the upper face of the sector 21. The end of the arm 35 is bent up as indicated by the reference numeral 39, and the remote portion of the bent up part 39 is beveled as indicated by the reference numeral 40. The end of the arm 41 carries a stud 42. A stud 43 is affixed to the under face of the sector 21.

Within the bottom of the casing 15 is an inner casing 44 which contains a clock-spring 45 having its outer end affixed to the casing 44 and its inner end secured to the sleeve 46 which carries the sector arm 47. Within the sleeve 46 is another sleeve 48 which carries a flange 49 and gear-wheel 50. Between the two sleeves 46 and 48 are the elements of a one-way friction clutch. Recesses 51 in the inner sleeve 48 are occupied by the rollers 52 which are held toward the ends of the respective recesses by means of the coil-springs 53. The gear wheel 50 engages a small gear-pinion 54 which in turn actuates a simple clock escapement mechanism 55.

The sector 47 carries on its upper face the two studs 56 and 57. A short shaft 58 passes through the sector 47 carrying an arm 59 on the upper side and an arm 63 on the lower side. These arms 59 and 63 terminate respectively in the lugs 60 and 64. A leaf-spring 61 held at the point 62 on the sector 47 acts against the arm 59. A lug 65 projects from the inner face of the casing wall 15 so as to be in a position to co-act with the lug 64.

The arm 21 is rotated in a clockwise direction with a speed proportional to the speed which it is desired to measure. On the other hand the arm 47 is rotated in a counter-clockwise direction by the spring 45 acting through the clutch elements 52. As will more fully appear hereinafter, this movement of the arm 47 is intermittent. Whatever the position of the arm 29 (and the pointer 27) one or the other of the lugs 32, 33 will be caught by the respective lug 39 on the sector 21 or the stud 56 on the sector 47. Thus one or the other of the oppositely rotating sectors 21 and 47 will pick up the arm 29 and carry it with it. Which it will be will depend on which will reach the arm 29 first. When in their opposite movement the two sectors meet each other, that is, when the lug 57 on the sector 47 strikes the lug 42 on the sector 21,—then the shaft 34 will be rotated so as to swing the hook or lug 39 aside, thus permitting the sector 21 to keep on its way leaving the arm 29 behind it. The friction of the spring 30 will serve to keep the arm 29 in the position where it is left. The conjunction of the respective projections 57 and 42 from the respective sectors 47 and 21 occurs a moment before the lugs 32 and 33 on the arm 29 are engaged by the projections 39 and 56 from the respective sectors 21 and 47. It is obvious that the sectors 21 and 47 would lock against each other at this time were it not that the hook 39 is displaced as has just been described. Immediately after the hook 39 has been displaced, the stud 43 on the sector 21 strikes the hook 60 on the sector 47, and thus the sector 21 in the course of its further rotation carries the sector 47 backward with it. The two sectors 21 and 47 continue thus to move together until the lug 64 strikes the projection 65 thus displacing the hook 60. Thereupon, the sector 21 continues its movement in a clockwise direction while the sector 47 commences its movement in a counter-clockwise direction. The sector 21 moves with speed proportional with that to be measured; the sector 47 moves with a uniform constant speed determined by the clock mechanism 55. Starting thus in opposite directions from the releasing stud 65, it is obvious that they will meet again at a point determined by the speed of rotation of the sector 21. As has been explained, unless the pointer 21—27 is in the exact position of meeting point, it will be moved to that position and in any case it will be left there. The movement of the sector 21 is a continuous rotary movement while that of the sector 47 is oscillatory. In one direction the movement of the sector 47 is due to the spring 45 acting through the clutch elements 52, and timed by the clock escapement 55. In the opposite direction the movement of the sector 47 is due to the interlocking of the same with the sector 21. This backward movement obviously restores the spring 45, but does not affect the clock mechanism 55, the clutch elements 52 serving to prevent transmission of the backward rotation of the collar 46 to the collar 48.

A little consideration will show that the indications on the dial must be crowded together for higher speeds, inasmuch as no speed however great could carry the speed sector 21 quite one complete revolution until it would meet the time sector 47. I so proportion the parts that a moderately high speed will be indicated by a sweep of the pointer 27 over half the circumference of the dial. In Fig. 2 such half sweep of the pointer is made to indicate a speed of thirty miles an hour.

While I have shown my invention in a particular form adapted for use with an automobile, I desire to state that its principle is not limited to the embodiment here disclosed but is obviously much broader.

I claim:

1. In a device of the class described, the combination of a clock driven element adapted to travel at a constant speed in one direction, a variable speed driven element adapted to travel at a variable speed in a counter direction, and means adapted to be actuated by either of said driven elements and when so actuated to be released by the other element for indicating the speed of the variable speed element.

2. In a device of the class described, a dial, a pointer, a clock driven element adapted to move the pointer in one direction, a variable speed element adapted to move the pointer in the opposite direction, and means to release the pointer at a position determined by the meeting of the two said elements.

3. In a device of the class described, a dial, a pointer, a clock driven arm adapted to move the pointer in one direction, a variable speed driven arm adapted to move the pointer in an opposite direction, and means to release the pointer when the said arms meet.

4. In a device of the class described, a dial, a pointer, a clock driven arm adapted to move the pointer in one direction, a variable speed driven arm adapted to move the pointer in an opposite direction, means to release the pointer when the said arms meet, and means controlled by the variable speed driven arm to engage the other arm and restore it.

5. In a device of the class described, a dial, a pointer, a clock driven arm adapted to move the pointer in one direction, a variable speed driven arm adapted to move the pointer in an opposite direction, means to release the pointer when the said arms meet, means controlled by the variable speed driven arm to engage the other arm and restore it, and means to release the restored arm at a fixed point.

6. In a device of the class described, a dial, a pointer, a clock driven arm adapted to move the pointer in one direction, a variable speed driven arm adapted to move the pointer in an opposite direction, means to release the pointer when the said arms meet, an escapement mechanism to control the speed of the clock driven arm, and a clutch to permit backward movement of said arm without affecting the escapement, 7. In a device of the class described, a dial, a pointer, a clock driven arm with a stud adapted to engage the pointer, a variable speed arm with a pivoted member adapted to engage the pointer, and a stud on the first named arm adapted to displace said pivoted member.

8. In a device of the class described, a dial, a pointer, a clock driven arm having a pivoted member thereon, a variable speed arm with a stud thereon adapted to engage said pivoted member, and a fixed stud adapted to displace said pivoted member and release it from engagement with the stud on the variable speed arm.

9. In a device of the class described, a dial, a pointer, a rotatable arm, a clock spring for driving said arm, a clock escapement mechanism adapted to be driven by said spring through a one-way clutch to regulate the speed of rotation of said arm, a variable speed arm, means independent of the clock for driving said variable speed arm, and means to register the relation of said arms.

10. In a device of the class described, the combination of a clock driven element, a variable speed driven element and means adapted to be engaged by either one of said driven elements and when so engaged to be released from such engagement by the other driven element for indicating the speed of said variable speed element.

11. In a device of the class described, the combination of a clock driven element, a variable speed driven element mounted concentrically therewith, and means adapted to be engaged by either one of said driven elements and when so engaged to be released from such engagement by the other driven element for indicating the speed of the variable speed element.

12. In a device of the class described, the combination of a clock driven element adapted to travel in one direction, a variable speed driven element adapted to travel in the opposite direction, and means adapted to be engaged and moved by either element and when so engaged to be released when the elements assume a predetermined relative position, for indicating the speed of the variable speed element.

In testimony whereof, I have subscribed my name.

DILLWYN M. BELL.

Witnesses:
ANNA L. SAVOIE,
LILLIAN A. KIBBY.